Dec. 16, 1952     G. JENDRASSIK     2,621,946
SEAL

Filed Feb. 28, 1948     3 Sheets-Sheet 1

Inventor
George Jendrassik
By
Stevens, Davis, Miller & Mosher
his Attorneys

Dec. 16, 1952  G. JENDRASSIK  2,621,946
SEAL
Filed Feb. 28, 1948  3 Sheets-Sheet 2

Inventor
George Jendrassik
By
Stevens, Davis, Miller & Mosher
Attorneys

Dec. 16, 1952  G. JENDRASSIK  2,621,946
SEAL

Filed Feb. 28, 1948  3 Sheets-Sheet 3

Inventor,
George Jendrassik
By
Stevens, Davis, Miller and Mosher
his Attorneys

Patented Dec. 16, 1952

2,621,946

UNITED STATES PATENT OFFICE 2,621,946

SEAL

George Jendrassik, Budapest, Hungary

Application February 28, 1948, Serial No. 12,105
In Hungary August 29, 1944

4 Claims. (Cl. 286—11.14)

This invention relates to a sealing arrangement for working surfaces of constructional parts moving relatively to each other.

A well known engineering problem is to provide an efficient seal effect against overpressures between the relatively moving working surfaces of constructional parts which is not influenced by the friction of the working surfaces. The solution of this problem is especially difficult in case of constructional parts operating at higher temperatures, e. g. at temperatures from 250–500° C., and of sealing arrangements which are exposed to air and oxygen. In such cases lubrication with oil or grease is ineffective. The friction in such cases produces wear on the working surfaces and also sets up vibrations.

One object of the present invention is to obviate the foregoing drawbacks to a substantial extent.

Another object of the invention is to provide a sealing arrangement for use in connection with a pair of members moving relatively to each other under high temperature conditions, which is simple, inexpensive and efficient.

To this end, the sealing arrangement of the present invention comprises a block, a sealing arrangement for use in connection with a pair of members moving relatively to each other under high temperature conditions, comprising a block of predominantly carbonaceous solid material having lubricating properties at normal temperatures, mounted in one of said moving members to bear on the other of said moving members, and a plurality of bodies of a solid refractory material having lubricating properties at higher temperatures, bearing on the surface of at least one of said relatively moving members.

The predominantly carbonaceous material hereinbefore referred to preferably consist of dynamo brush carbon, arc lamp carbon or retort carbon whilst the aforesaid solid refractory material preferably consists of talc, mica or zinc oxide, all of which are known to have lubricating properties at temperatures between 250 and 500° C.

Further objects and advantages of the invention will become apparent from the following description taken in conjunction with the accompanying drawings in which.

In said drawings like parts are denoted by like reference characters.

Figure 1:
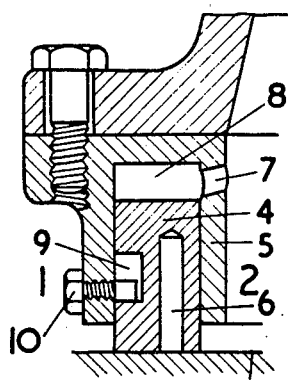
Fig. 1 is a vertical section through part of one embodiment.
Figure 2:
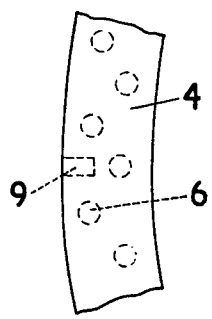
Fig. 2 is a partial top plan view of the member 4 of Fig. 1.

In the embodiment shown in Figs. 1 and 2, numeral 1 denotes a space, e. g. the atmosphere, against which the space 2 under higher pressure is sealed along the working surface of a member 3 by an arcuate brush 4 which is slidably disposed in a groove of a member 5 moving relatively to the member 3. In the embodiment shown, the brush 4 consists of solid homogeneous carbonaceous material in which are provided bores perpendicular to the working surface of the brush 4, which bores house talc rods 6 pressed therein. A space 8 is left between the end of the brush 4 remote from the member 3 which space 8 is in communication with the higher-pressure space 2 through an opening 7 so that the brush 4 is forced by the higher pressure prevailing in space 2 against the surface of the member 3.

As shown in Fig. 2, the brush 4 is provided with two longitudinal rows of talc rods 6 in such a manner that the exposed surfaces of the talc rods 6 ensure the lubrication of the greater part of the working surfaces of the members 3 and 4. Instead of two rows of talc rods a plurality of rows may also be employed. The brush 4 consisting of a solid homogeneous carbonaceous material such as a dynamo brush carbon, arc lamp carbon or retort carbon, has lubricating properties at relatively low temperatures but loses these at higher temperatures of the order of above 200° C. then tending to produce wear on the working surface 3 and to set up vibrations. This tendency to set up wear and produce vibrations is obviated by the talc deposited from the rods 6 between the wearing surface of the brush 4 and the surface of the member 3. The working surface of the brush 4 as well as the talc rods become worn off simultaneously as a result of which particles of talc are introduced between the working surfaces and, on one hand, reduce the extent of wear and, on the other hand, ensure good lubrication without scoring even at high temperatures. The brush 4 is automatically advanced as it wears down by the overpressure acting on the upper end thereof. In order to prevent excessive wear of the brush 4 it is advantageous to insert a screw stop 10 through the outer wall of the groove to engage in a lateral recess 9 of the brush 4 as shown in Fig. 1. In such a case the brush 4 will be worn off only to an extent corresponding to the depth of the recess 9 after which it will no longer be pressed down by the overpressure. Since by that time however the working surfaces are well run in a sufficient tightening effect will be provided even if there is no possibility of further wear of the brush 4.

The embodiment shown in Fig. 3 differs from that described with reference to Figs. 1 and 2 in that no stop screw 10 is provided and that instead of making use of the overpressure prevailing in the space 2 to press down the brush 4, the brush 4 is pressed down by a helical spring 11. In addition the talc rods 6 are not inserted into bores of the brush 4 but in bores arranged similarly as shown in Fig. 2 but provided in the working surface of the member 3 since the surface of member 3 also wears, although to a much less extent than the brush 4, the talc rods 6 will be worn off by the brush 4 to permit the requisite amount of lubricating material to get between the working surfaces.

Figure 3:
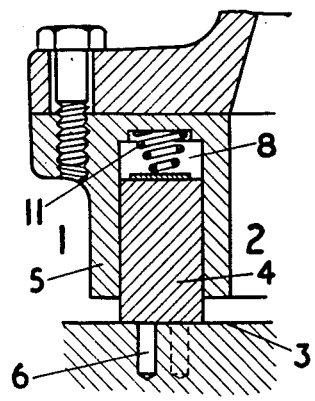
Fig. 3 is a vertical section through part of a second embodiment.

In the embodiments shown in Figs. 1 to 3 the talc rods 6 can be replaced by rods of compressed zinc oxide in a finely divided sootlike state.

Wear as well as danger of scoring can be additionally reduced by reducing the pressure causing friction between the working surfaces e. g. in case of the embodiment shown in Figs. 1 and 2 the pressure prevailing in the space 8. To this end, in the embodiment shown in Figs. 4 and 5, a relief groove 13 is cut into one of the working surfaces in the proximity of the low-pressure space 1 which groove 13 communicates with the high-pressure space 8 above the brush 4 through bores 12 formed in the brush. In the instant embodiment the groove 13 is cut into the working surface of the brush 4 and a small cutting tool 14 is arranged in the member 3 which tool enters the groove 13 and ensures that losses of the groove 13 caused by wear of the working surfaces are permanently compensated by recutting. The cutting tool 14 is secured in the part 3 by a fixing screw 15. The relief groove 13 can however, also be disposed on the working surface of part 3 whereby the cutting tool 14 is to be placed in the part 3 in such a manner that its cutting edge should take place only within the groove 13 without rising above the working surface of part 3 so that the brush 4 forwarded as it is getting worn off will be permanently cut off on its unworn part opposite to the groove 13.

The advantage of the aforedescribed relief groove 13 is based on the consideration that in case of the embodiments as shown in Figs. 1 and 2 or 3, having no relief groove, the pressure in the gap between the adjacent working surfaces varies approximately linearly along the width of the brush 4 from the higher pressure prevailing in space 2 to the lower pressure prevailing in space 1, so that in consequence of this linear variation the pressure producing the friction is approximately equal to half the pressure acting on the upper end of the brush 4. By employing a relief groove 13 and communicating bores 12 the pressure prevailing in space 2 also prevails in the groove 13. The pressure prevailing beneath the brush 4 between the groove 13 and the edge of the brush adjacent the space 2 is substantially equal to the pressure in the space 2 and it compensates along the same section of the brush width the pressure prevailing in the space interval 8 so that beneath the brush 4 the pressure has to drop from the pressure prevailing in space 2 to the pressure prevailing in space 1 only over the narrow strip between the groove 13 and the side of the brush 4 facing the space 1. Accordingly the pressure setting up friction between the working surfaces will be reduced in dependence on the ratio of the surfaces on either side of the groove 13 this pressure being distributed along the entire width of the brush 4 so far as wear is concerned so that the specific pressure is considerably lower, with the result that wear and danger of scoring are reduced.

Figure 4:
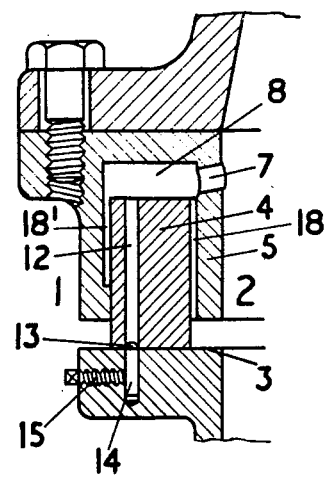
Fig. 4 is a vertical section through part of a third embodiment.
Figure 5:
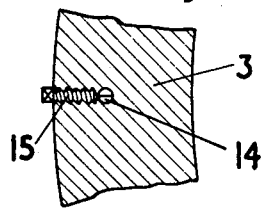
Fig. 5 is a partial top plan view of the member 3 of Fig. 4.

By reducing the pressure on the brush as described, the pressure prevailing in the gap 18 between the inner surfaces of the brush 4 and the groove which tends to press the brush laterally against the outer wall, as well as the frictional resistance between the engaging flanks of the brush 4 and the groove, set up thereby, may become so high as to prevent the brush 4 from advancing to compensate wear. It is therefore advantageous to reduce the supporting surface of the outer groove wall by a cavity 18' as shown in Fig. 4. In this case the brush 4 engages with the outer groove wall only at its lower part.

Since the brushes 4 normally have only a moderate strength since in most cases the direction of their relative movements are conformable with their own longitudinal direction, it is possible that where the brushes are of substantial length the frictional resistance will cause the brush to shift in the longitudinal direction within its supporting groove with the result that in view of its moderate strength, the brush may break. In order to prevent that it is advantageous to divide the sealing elements in their longitudinal direction into several sections and to dispose said sections in separate supporting compartments of the groove.

Figure 6:
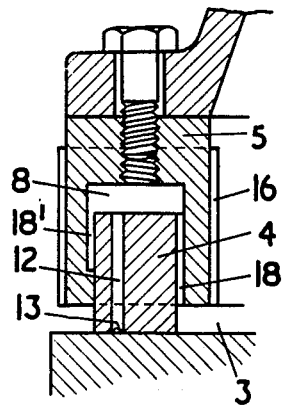
Fig. 6 is a vertical section through part of a fourth embodiment.
Figure 8:
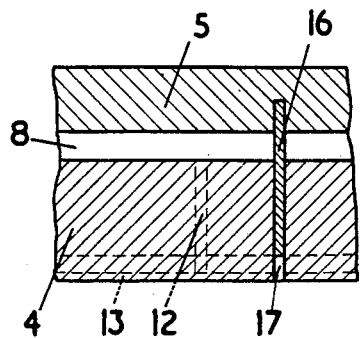
Fig. 8 is a vertical section perpendicular to the section of Fig. 6.
Figure 7:
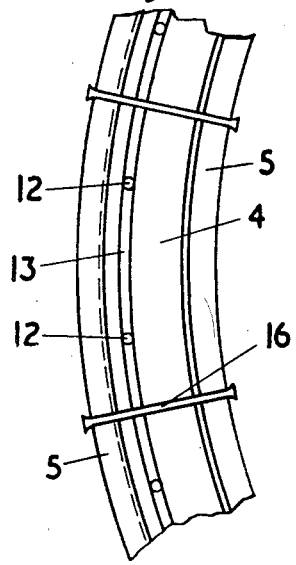
Fig. 7 is a top plan view of Fig. 6.

An embodiment of this kind is shown in Figs. 6 to 8 in which each of the parts of the seal are provided with a relief groove. In this case the supporting compartments of the groove are formed by thin partitions 16 wholly traversing the groove and pressed into suitable transverse notches of the member 5 provided with the groove, in such a manner that they even extend beyond the bottom of the groove in the member 5. For the same purpose the partitions 16 are fastened by jamming them on either sides of the part 5 as shown in Fig. 7. The individual short parts 4 of the subdivided brush are held by the partitions 16 and are prevented from shifting in the longitudinal direction and from seizing and thus breaking. The partitions 16 must not extend beyond the lower front surface of the part 5 at its end adjacent the seal since the gap between the working surfaces of the parts 5 and 3 must obviously be as small as possible consistent with the mutual movement of the parts 5 and 3. By virtue of this arrangement there remain only between adjacent brush sections 4 beneath each of the partitions 16 slight uncovered gaps 17 through which the high-pressure space 2 communicates with the low-pressure space 1. In view of the thinness of the partitions 16 these gaps 17 are very narrow permitting only a negligible escape of pressure.

Figure 9:
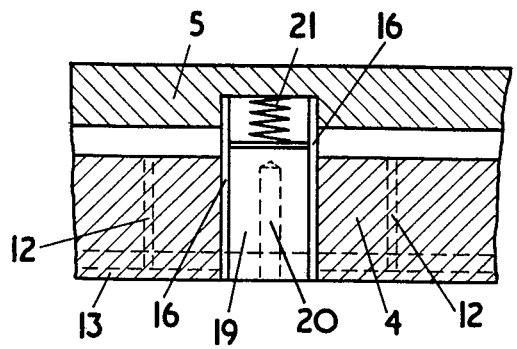
Figs. 9 and 10 are respectively a vertical section and an inverted plan of a fifth embodiment.
Figure 10:
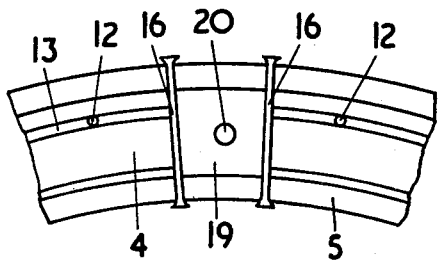

Lubrication with the aforementioned solid refractory lubricants, preferably talc, may be effected also by inserting lubricating blocks 19 between the parts 4 of the brush. Such an embodiment is shown in Figs. 9 and 10, which in other respects corresponds with the embodiments described with reference to Figs. 6 to 8. The lubricating block 19 having the same width as the section 4 of the brush is slidably inserted between the partitions 16. The lubricating block 19 is pressed by a helical spring 21 which bears on the one hand against the grooved part 5 and, on the other hand, against a support plate disposed on the upper front surface of the lubricating block 19. Since the block 19 wears down considerably more quickly than the brush 4, it is advisable to reduce the wear of the lubricating block 19 and to accommodate it to the wear of the brush 4. To this end a small rod 20 preferably of the same material as the brush sections 4, is pressed into a bore of the block 19 so that said block is prevented from wearing more quickly than the harder rod 20. Instead of being provided with only one rod 20 each lubricating block 19 may be provided with two or several rods 20.

Figure 11:
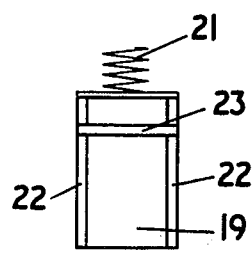
Fig. 11 is a front elevation of a sixth embodiment.

Based on the same principle, wear of the lubricating block 19 can be reduced by securing a small carbon plate 22 to each side of the lubricating block 19 engaging with a partition 16 as shown in Fig. 11. In the embodiment shown the plates 22 are secured by a rivet 23. However, said plates can also be adhesively secured to the block 19.

The lubricating block 19 may also be made of graphite which has an excellent lubricating capacity. In this case also undue wear of the lubricating block 19 can be prevented by employing insertion rods or cover plates of a material the hardness of which is approximately equal to that of the material of the brush.

It has been described in connection with Figs. 1 and 2 that the small lubricating rods may be placed in bores either of the tightening element or of the working surface opposite to it. It is, however, within the scope of my invention also to provide both the working surfaces with insertion pieces made of solid and heat-proof lubricants suitable for the purposes of my invention whereby the insertion pieces may be arranged in bores or in any other suitable manner.

When employing mica as lubricant, the rods may be made of mica scales preferably with addition of powdered carbon or graphite and/or of any suitable cement, the mica scales being disposed in the rods substantially at right angles to the longitudinal direction of the same. In this case the lubricating effect in the gap between the working surfaces is produced by the scales being worn off from the rods. The mica scales, however, may also be filled into bores of the brush or of the opposing working surface.

This application is a continuation-in-part of my copending application Serial No. 12,103 filed February 28, 1948.

I claim:

1. A sealing arrangement for use in connection with a pair of members moving relatively to one another under high temperature conditions comprising a face formed on one of said members, a channel formed on the other of said members with its opening adjacent said face, a compact carbon block of the group comprising dynamo brush carbon, arc lamp carbon, retort carbon and like carbons having lubricating properties in the temperature range up to 250°–300° C. arranged in said channel with a face engaging said face of said one member in rubbing contact, means for loading said block in sealing engagement with said face of said one member and at least one solid refractory body of the group comprising talc, mica and zinc oxide having lubricating properties in the temperature range above 250°–300° C. associated with said block and contacting at least one of said rubbing faces so that particles of both said block and refractory body are worn off by rubbing and dispersed between the rubbing surfaces to lubricate them.

2. A sealing arrangement for use in connection with a pair of members moving relatively to one another under high temperature conditions comprising a face formed on one of said members, a channel formed on the other of said members with its opening adjacent said face, a compact carbon block of the group comprising dynamo brush carbon, arc lamp carbon, retort carbon and like carbons having lubricating properties in the temperature range up to 250°–300° C. arranged in said channel with a face engaging said face of said one member in rubbing contact, means for loading said block in sealing engagement with said face of said one member, and a plurality of solid refractory rods of the group comprising talc, mica and zinc oxide having lubricating properties in the temperature range above 250–300° C. embedded in said carbon block, each with its longitudinal axis normal to the rubbing face of said carbon block and contacting said face of said one member so that particles of both said block and said refractory bodies are worn off by rubbing and dispersed between the rubbing surfaces to lubricate them.

3. A sealing arrangement for use in connection with a pair of members moving relatively to one another under high temperature conditions comprising a face formed on one of said members, a channel formed on the other of said members with its opening adjacent said face, a compact carbon block of the group comprising dynamo brush carbon, arc lamp carbon, retort carbon and like carbons having lubricating properties in the temperature range up to 250°–300° C. arranged in said channel with a face engaging said face of said one member in rubbing contact, means for loading said block in sealing engagement with said face of said one member, and a plurality of solid refractory rods of the group comprising talc, mica and zinc oxide having lubricating properties in the temperature range above 250°–300° C. inserted in said one member each with its longitudinal axis normal to the face of said one member and contacting said face of said carbon block so that particles of both said block and said refractory bodies are worn off by rubbing and dispersed between the rubbing surfaces to lubricate them.

4. A sealing arrangement for use in connection with a pair of members moving relatively to one another under high temperature conditions comprising a face formed on one of said members, a channel formed on the other of said members with its opening adjacent said face, a plurality of compact carbon blocks of the group comprising dynamo brush carbon, arc lamp carbon, retort carbon and like carbons having lubricating properties in the temperature range up to 250°–300° C. arranged in said channel each with a face engaging said face of said one member in rubbing contact, means for loading said blocks in sealing engagement with said face of said one member, pairs of partitions interposed between adjacent blocks to separate them in said channel and at least one body of solid refractory material of the group comprising talc, mica and zinc oxide having lubricating properties in the temperature range above 250°–300° C. interposed in said channel between the partitions of at least one pair of said partitions and engaging said face of said one member so that particles of both said blocks and said solid refractory material are worn off by rubbing and dispersed between the rubbing surfaces to lubricate them.

GEORGE JENDRASSIK.

REFERENCES CITED

The following references are of record in the file of this patent:

UNITED STATES PATENTS

| Number | Name | Date |
|---|---|---|
| 146,750 | Colby | Jan. 27, 1874 |
| 387,900 | Mills | Aug. 14, 1888 |
| 866,062 | Pierce | Sept. 17, 1907 |
| 934,289 | Dailey | Sept. 14, 1909 |
| 1,239,132 | Smith | Sept. 4, 1917 |
| 1,558,925 | Rogers | Oct. 27, 1925 |
| 1,805,155 | Weeks | May 12, 1931 |
| 2,307,346 | Allen | Jan. 5, 1943 |

FOREIGN PATENTS

| Number | Country | Date |
|---|---|---|
| 18,104 | Great Britain | Sept. 7, 1899 |
| 552,859 | Germany | June 18, 1932 |